May 9, 1950      G. H. CARROLL      2,506,777
INDICATOR FOR AUTOMOBILE HEADLIGHTS
Filed June 1, 1948
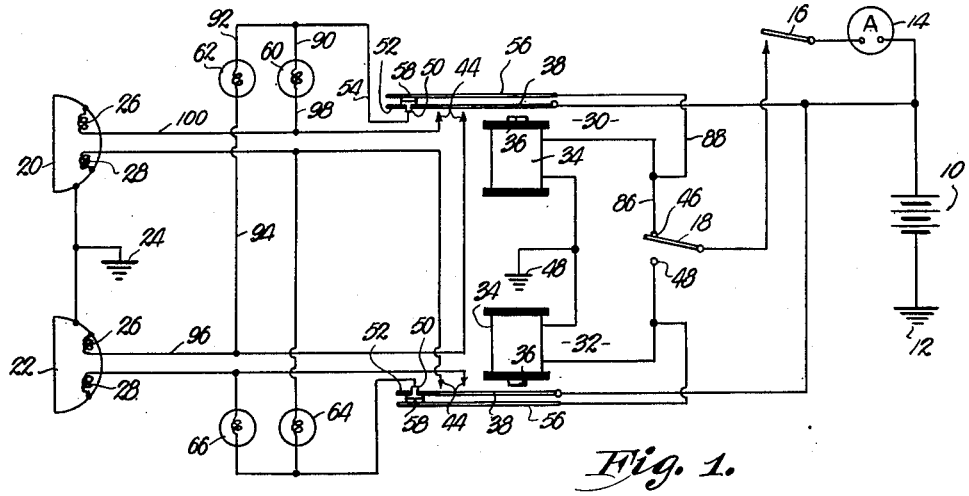
*Fig. 1.*
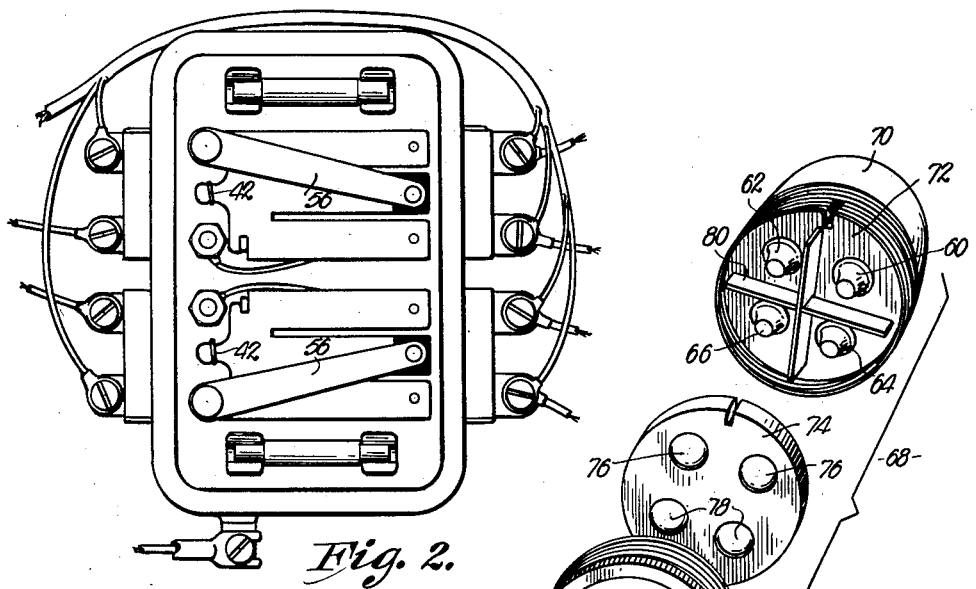
*Fig. 2.*
*Fig. 4.*
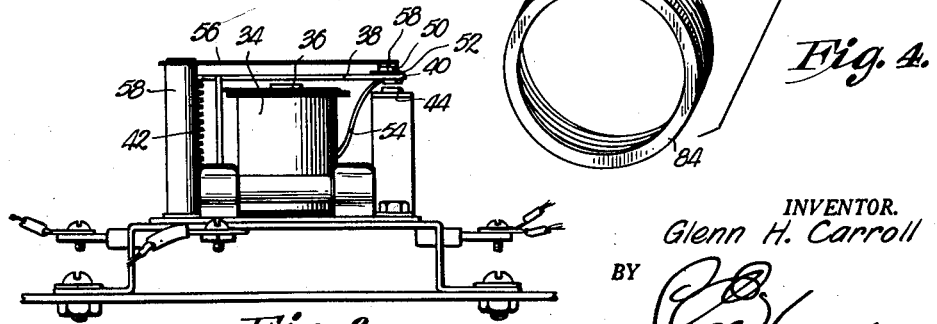
*Fig. 3.*
INVENTOR.
Glenn H. Carroll
BY
ATTORNEY.

Patented May 9, 1950

2,506,777

UNITED STATES PATENT OFFICE 2,506,777

INDICATOR FOR AUTOMOBILE HEADLIGHTS

Glenn H. Carroll, Overland Park, Kans.

Application June 1, 1948, Serial No. 30,231

3 Claims. (Cl. 315—83)

This invention relates to an electric lighting system particularly for use with automobiles having an electric circuit, switch means, a plurality of lamps and other elements formed as a part thereof, the primary aim of the invention being to provide means for indicating at a point remote from the lamps when the filaments thereof are in operative working order.

The most important object of this invention is the provision of an electric lighting system for automobiles having an electric circuit provided with the usual automobile headlight, a dashboard switch and the foot actuated switch for converting the headlights to bright or dim conditions and a relay for causing energization of the lamps when the dashboard switch is closed, the invention consisting of means forming a part of the relay and actuated thereby for indicating to the automobile driver when the filaments of the headlights are burned out through the medium of an indicator attachable to the automobile dashboard and signalling to the operator only for an instant during actuation of the foot control when the filaments are all operative.

An important object of this invention is the provision of an automobile lighting system as above mentioned, having a specially formed relay interposed therein for causing energization of the headlights of the automobile when the conventional dashboard switch is closed, the main electric circuit having a secondary by-pass circuit shunted across the relay and having switch means therein normally closing the secondary circuit and movable to the open position when the relay is energized.

Other objects of this invention relate to the manner in which a separate flash-bulb is provided with each filament of the headlight lamps; the way in which the operator may determine which of such elements is burned out simply by actuation of any one of the switches in the lighting system; the way in which the secondary switching means within the relay is actuated mechanically to open the above mentioned secondary circuit after the indicating lamps have been momentarily illuminated; and to details of construction of the relay and the signalling assemblies per se.

Other more minor objects will be made clear during the course of the following specification, reference being had to the accompanying drawing, wherein:

Fig. 1 is a schematic wiring diagram showing the lighting system for automobiles having indicating means for the headlights interposed therein.

Fig. 2 is a top plan view of the especially formed relays with the cover thereof entirely removed.

Fig. 3 is an end elevational view thereof; and

Fig. 4 is a stretched-out perspective view of the communicator lamps and holder therefor.

The conventional automobile lighting circuit is partially shown in Fig. 1 of the drawing consisting of automobile battery 10 grounded as at 12, the ammeter 14, the manually manipulable dashboard switch 16, a switch 18 commonly disposed at the floorboard of the automobile for alternately switching the headlights from dim to bright positions and a pair of headlights 20 and 22 respectively.

These two lamps 20 and 22 are grounded as at 24 in the usual manner and are provided with bright filaments 26 and dim filaments 28 encased within a single envelope for each lamp 20 and 22 in the usual manner.

The conventional system includes a pair of relays broadly designated by the numerals 30 and 32 provided with coils 34, cores 36 and swingable armatures 38. As illustrated clearly in Figs. 2 and 3 of the drawing, these armatures 38 are each provided with a pair of contact points 40 on the lowermost face thereof adjacent one end and opposite to the hingedly mounted end thereof that are yieldably held in the position illustrated in Fig. 3 by a spring 42. These contacts 40 are movable toward and away from corresponding stationary contacts 44.

The conventional operation of this lighting system upon closing the switch 16 is to cause energization of either relay 30 or the relay 32 as the case may be, depending upon the position of switch 18 to energize either the bright filaments 26 or the dim filaments 28 of the two headlights 20 and 22. From the battery 10 (Fig. 1) this circuit is easily traceable through ammeter 14, closed switch 16, switch 18 in the closed position with respect to stationary contact 46, through coil 34 of relay 30 and thence to a ground 48 for both relays 30 and 32.

As above mentioned, the armatures 38 of both relays 30 and 32 are held normally in the open position by virtue of the springs 42 and thus, when core 36 of coil 34 is magnetized, the armature 38 of relay 30 will be attracted from the position shown in Fig. 1 to a position engaging the contacts 44 and closing the circuit through armature 38 and thence to the bright filaments 26 of both lamps 20 and 22.

This same circuit is traceable from the foot actuated switch 18 to the relay 32 when switch 18 is moved to the position engaging fixed contact 48 disposed in opposed relationship to contact 46.

When relay 32 is energized to attract its armature 38, the dim filaments 28 of the two lamps 20 and 22 will be energized, providing of course, that the switch 16 is in the closed position.

A secondary circuit is imposed within these main circuits just above described, shunted across the respective relays 30 or 32 as the case may be. In other words, there is a shunt circuit for each relay 30 and 32. Interposed within this secondary circuit is a contact point 50 secured directly to the armatures 38. As illustrated in Fig. 2 of the drawing, the armatures 38 are provided with three fingers or furcations, the two outermost of these fingers having the contact points 40 secured thereto, whereas, the center of these fingers carries the contact 50. This contact point 50 is embedded within insulation 52 separating the same from the metallic substance from which the armatures 38 are formed and has connection with a flexible wire 54.

An elongated arm 56 mounted upon a post 58 adjacent the springs 42 of the respective relays 30 and 32 overlies the armature 38 and terminates at its free end adjacent the contact point 50. This outermost free end of the arms 56 is provided with an underlying contact point 58 disposed above and in alignment with the contact point 50 on the center arm of armature 38. Arm 56 and its contact point 54 is normally disposed where the contact point 50 of armature 38 is engaged and closed with respect to contact point 58 when armature 38 is in the position illustrated in Fig. 1 of the drawing. This normally closed position between the contacts 50 and 58 is clearly illustrated in Fig. 3 of the drawing which also shows the normally open position with respect to two pairs of the contact points 40 and 44.

The above mentioned secondary shunt circuits each have also interposed therein a pair of small lamps 60 and 62 and 64 and 66 respectively. As clearly illustrated in Fig. 1 of the drawing, the lamps 60 and 62 are in series with the two bright filaments 66 of lamps 20 and 22 respectively, whereas the lamps 64 and 66 are connected in series with the dim filaments 28 of the lamps 20 and 22 respectively.

Mounting means for these four relatively small signal lamps 60, 62, 64 and 66 is clearly illustrated in Fig. 6 of the drawing and is broadly designated by the numeral 68. This mounting means 68 includes a hollow housing 70 having the usual sockets (not shown) mounted therein for receiving the four signal lamps, said lamps passing through a plate 72 and into corresponding openings formed in a second plate 74. These openings of the plate 74 have mounted on the outermost face thereof and in communication with the four openings, a pair of translucent colored buttons 76 and a second pair of translucent buttons 78 of a different color. It is preferred that the buttons 76 for registering with the lamps 60 and 62 be red to indicate the bright filaments 26 of the lamps 20 and 22 and that the buttons 78 corresponding to the lamps 64 and 66, be of a green color to indicate and correspond with the dim filaments 28 of headlights 20 and 22.

A spacer 80 between the plates 72 and 74 holds such plates apart and separates the four lamps 60, 62, 64 and 66.

A tubular internally threaded cap 84 is received by the body 70 for holding the plates 72 and 74 and the spacer 80 in place within the body 70. Any suitable means not shown, may be utilized for mounting this holding assembly 68 at a desirable point on the automobile dashboard where the illumination of the buttons 76 and 78, as hereinafter described, is in full view of the automobile operator.

Assuming the dashboard switch 16 to be closed and the foot-operated switch 18 in the position shown in Fig. 1 of the drawing in engagement with contact point 46, one of the secondary by-pass circuits having lamps 60 and 62 interposed therein, is traceable as follows:

From contact point 46 through lines 86 and 88, arm 56 normally close contact points 58 and 50 on arm 56 and armature 38 respectively, flexible wire 54 and lines 90 and 92 through lamps 60 and 62 respectively.

From lamp 62 the circuit is traced to head lamp 22 through lines 94 and 96 to bright filament 26 of lamp 22. This circuit is also traceable from lamp 62 to head lamp 20 by way of lines 98 and 100 to bright filament 26 of lamp 20.

The other secondary circuit which is shunted across the relay 32 is traceable in the same manner to the dim filaments 28 of lamps 20 and 22, the green colored indicating lamps 64 and 66 corresponding to the dim filaments 28 of lamps 20 and 22 respectively.

It is thus seen when switch 16 is closed and when switch 18 is engaged with contact point 46, that the secondary circuit just above traced through lamps 60 and 62 will immediately be energized because of the normal closed condition of contact points 50 and 58 of the relay 30. This energization of such secondary circuit will only be momentary however, because closing of the switch 16 will immediately cause energization of the relay 30 as hereinabove described to attract armature 38, closing the contact points 40 therewith with the stationary contact points 44 to energize the bright filaments 26 of lamps 20 and 22. When the armature 38 so moves, the contact point 50 thereof will move away from the contact point 58 of arm 56 and immediately deenergize the second circuit and consequently the lamps 60 and 62. By the same token, once the switch 16 is closed, shifting of the switch 18 from a position opening the circuit through relay 30 and subsequent movement of such switch 18 back to a point in closing relationship with contact point 46, will cause a momentary energization of the secondary circuit shunted around relay 30 and again the lamps 60 and 62 will burn for only a moment.

Obviously, this same operation is effective with respect to the relay 32, the shunt circuit in parallel therewith, the lamps 64 and 66 and the dim filament 28 of head lights 20 and 22. It is obvious also that the reason for such operation is because an electric current is much faster than a mechanical operation and inasmuch as the contact points 50 and 58 of armatures 38 and arms 56 respectively, are normally closed, the signal lamps will be illuminated before the respective relays 30 and 32 can come into operation mechanically to deenergize such secondary by-pass circuits.

It is also clear that inasmuch as the headlights 20 and 22 are grounded as at 24, the signal lamps can be energized only when the respective filaments 26 and 28 are functioning properly. If any one of the four filaments 26 and 28 should burn out, a subsequent actuation of either switch 16 or switch 18 will fail to cause illumination of the signal lamp 60, 62, 64 or 66 corresponding to such burned out filament. The operator of the automobile will then immediately know not only that one of the four filaments of his headlights is not functioning but will know exactly which of such four filaments has burned out.

Another important feature of the system just above described lies in the fact that the lamps for indicating the condition of the automobile headlights burn only momentarily rather than continuously as is true with many types of such systems and, therefore, the efficiency of the automobile lighting system is not diminished to any appreciable extent. Other systems operate on the principal that the indicating means comes into operation only when the particular filament or automobile headlight itself ceases to function. These types of indicators then burn continuously until the operator is able to replace the inoperable lamp.

Obviously, this last mentioned system is unsatisfactory because the efficiency of the remaining operating headlamps is immediately cut down because of the continuous operation of the signal means until the damaged lamp can be replaced. Furthermore, the four relatively small signal lamps of this system are in no way irritating to the automobile driver and may be disposed in an inconspicuous position, yet in full view of the automobile operator to the end that he can make a test at any time he desires.

Actually the efficiency of the automobile light circuit is increased through insertion of the above described system. It provides a more direct path from the battery 10 to headlamps 20 and 22 than does standard equipment on present day automobiles. None of the relay windings or indicating elements are disposed in the main light circuit. Other indicating systems thus far developed place the relay windings in series with the headlight filaments, thereby decreasing the efficiency of the system.

It is also believed worthy of mention that this system can easily and quickly be inserted into the conventional automobile lighting systems by mere alteration of the usual type of relay now used. In other words, relays such as at 30 and 32 are in common use to the end that full efficiency is attained by the headlamps 20 and 22 without interference by the other electrical mechanism of the automobile and these desirable features are retained in the system forming the subject matter of this invention since all that has been done is the addition of a pair of secondary shunt circuits that in no way decrease the efficiency of the present lighting system except for an inconsequential flash signal occurring when the operator switches alternately from dim to bright or when he initially turns on his lights by means of the switch 16.

It is to be understood that relays 30 and 32 may be altered in various other ways, all within the spirit of this invention and further that various types of mounting means differing from that illustrated in Fig. 4 of the drawings might be used in the new circuit shown in Fig. 1 of the drawing. Accordingly, it is to be understood that such changes and modifications to the single embodiment of this invention disclosed and described as fairly come within the scope of the appended claims are contemplated hereby.

Having thus described the invention, what is claimed as new and desired to be secured by Letters Patent is:

1. In a lighting system having a first electrical circuit provided with a relay, a second electrical circuit having a lamp interposed therein, and means forming a part of said relay for closing said second circuit upon energization of the relay; structure for signalling at a point remote from said lamp when the latter fails to respond upon closing of said second circuit, said structure comprising a third electric circuit having a current responsive indicator in series with said lamp; a normally closed make and break mechanism in said third circuit; and apparatus forming a part of said means for breaking said mechanism upon energization of said relay.

2. In a lighting system having a first electrical circuit provided with a relay, a second electrical circuit having a lamp interposed therein, and means forming a part of said relay, and including a movable armature for closing said second circuit upon energization of the relay; structure for signalling at a point remote from said lamp when the latter fails to respond upon closing of said second circuit, said structure comprising a third electric circuit having a current responsive indicator in series with said lamp; and a normally closed make and break mechanism in said third circuit, said make and break mechanism including a stationary, electrical contact and an electrical contact on said armature movable therewith toward and away from said stationary contact.

3. A lighting system for automobiles comprising in combination, at least one lamp having a plurality of filaments; an electric circuit for each filament respectively; a relay for each filament respectively, each having parts for closing the corresponding filament circuit when energized; means including manually operable parts for alternately energizing the relays; a normally energized current responsive indicator in series with each filament respectively; and structure forming a part of said relays for deenergizing said indicators upon energization of corresponding relays.

GLENN H. CARROLL.

REFERENCES CITED

The following references are of record in the file of this patent:

UNITED STATES PATENTS

| Number | Name | Date |
| --- | --- | --- |
| 1,788,597 | Schultz | Jan. 13, 1931 |
| 1,999,781 | Pinkler | Apr. 30, 1935 |
| 2,100,695 | Lackey | Nov. 30, 1937 |
| 2,223,251 | Hack | Nov. 26, 1940 |
| 2,376,769 | Hale | May 22, 1945 |